United States Patent [19]

Kita

[11] 4,096,106

[45] Jun. 20, 1978

[54] AQUEOUS COATING COMPOSITIONS CONTAINING A RESIN PREPARED FROM THE REACTION PRODUCT OF POLYBUTADIENE WITH AN UNSATURATED DICARBOXYLIC ACID OR ANHYDRIDE

[75] Inventor: Ryuji Kita, Kawasaki, Japan

[73] Assignee: Chemische Werke Huls Aktiengesellschaft, Marl, Germany

[21] Appl. No.: 695,057

[22] Filed: Jun. 11, 1976

[30] Foreign Application Priority Data

Jun. 24, 1975 Japan ................................. 50-77688

[51] Int. Cl.$^2$ ................................................ C08L 9/10
[52] U.S. Cl. ............................. 260/29.7 H; 260/29.3; 260/29.4 UA; 260/29.7 NR; 526/14; 526/49
[58] Field of Search ...... 260/29.3, 29.4 UA, 29.2 EP, 260/29.7 NR, 29.7 H, 879; 526/14, 49

[56] References Cited

U.S. PATENT DOCUMENTS

| | | | |
|---|---|---|---|
| 3,363,659 | 1/1968 | Keckler et al. | 260/879 |
| 3,518,213 | 6/1970 | Miyoshi et al. | 260/879 |
| 3,595,850 | 7/1971 | Takayanagi et al. | 260/879 |
| 3,609,111 | 9/1971 | Kumanotani | 260/29.7 H |
| 3,853,801 | 12/1974 | Tominaga et al. | 260/29.3 |
| 3,908,049 | 9/1975 | Fitko | 260/29.4 UA |
| 3,935,140 | 1/1976 | Go et al. | 260/29.4 UA |

*Primary Examiner*—M. J. Welsh
*Attorney, Agent, or Firm*—Millen & White

[57] ABSTRACT

Aqueous coating compositions comprising a water-soluble or water-dispersible resin prepared by at least partially neutralizing with a basic compound an addition product of an α,β-unsaturated dicarboxylic compound and a butadiene polymer which has a number average molecular weight of 400–10,000 and contains 40–75% cis-1,4-bonds, 15% or less trans-1,4-bonds and 20–50% 1,2-bonds in the butadiene units forming the polymer chain.

8 Claims, No Drawings

AQUEOUS COATING COMPOSITIONS CONTAINING A RESIN PREPARED FROM THE REACTION PRODUCT OF POLYBUTADIENE WITH AN UNSATURATED DICARBOXYLIC ACID OR ANHYDRIDE

BACKGROUND OF THE INVENTION

The present invention relates to new aqueous coating compositions and more particularly to new aqueous coating compositions having excellent corrosion- and water-resistant properties.

Water based paints used in electrodeposition coating, brush painting, spray coating and the like are becoming increasingly popular in the market because such paints are safe and economical and are capable of forming smooth and uniform films. It has heretofore been known to use natural drying oils such as tung oil, linseed oil, alkyd resins, epoxy-ester resins, etc. as starting polymers for vehicles of these water based paints. With more recent technical developments, it has been found that natural drying oils may be substituted by liquid polybutadienes such as a liquid polybutadiene containing 80% or more 1,2-bonds (Japanese Patent Gazette No. 46-954), a liquid polybutadiene containing 50% or more, especially 75–85%, 1,4-bonds (U.K. Pat. No. 1,102,652) and a liquid polybutadiene containing 50% or more cis-1,4 bonds (Japanese Patent Gazette No. 50-1580), which are reacted with an $\alpha,\beta$-unsaturated dicarboxylic compound, typically maleic anhydride, and then at least partially neutralized with a basic compound to thereby make the addition product soluble or dispersible in water.

These compositions, however, have both merits and disadvantages in the resultant film properties. For example, when a polybutadiene which contains predominantly 1,2-bonds is used as a starting material for such a composition, the composition forms films of high hardness and resistance to water, but of low resistance to corrosion and of such a high viscosity that there are practical difficulties in workability. When a polybutadiene which contains predominantly cis-1,4-bonds is used as a starting polymer of such a composition, such coating composition will offer films of high resistance to corrosion but of slightly lower hardness and water resistance. Therefore, attempts have been made to overcome said respective disadvantages by using suitable proportions of a mixture of such polybutadienes. As one example, a technique has been developed in which a polybutadiene which contains predominantly 1,2-bonds is used in combination with a second polybutadiene which contains predominantly 1,4-bonds, e.g. cis-1,4-bonds (Japanese provisional Patent Publication No. 48-25732). This technique provides a coating composition yielding films which are improved in water resistance compared with the films obtained when the cis-1,4-polybutadiene component is used alone, and which are improved in corrosion resistance compared with the films obtained when the 1,2-polybutadiene component is used alone. However, the films so obtained show only intermediate properties of both polybutadienes. It has heretofore remained impossible to obtain films which simultaneously possess both the high resistance to corrosion achieved when the cis-1,4-polybutadiene is used alone and the high resistance to water achieved when the 1,2-polybutadiene is used alone.

OBJECTS OF THE INVENTION

Accordingly, a primary object of this invention is to provide aqueous coating compositions which are capable of forming films of superior resistance to corrosion and to water.

Another object of this invention is to provide aqueous coating compositions which are capable of forming films superior in hardness, adhesion and impact strength.

A further object is to provide aqueous coating compositions having excellent electrodeposition characteristics.

Upon study of the specification and appended claims, further objects and advantages of this invention will become apparent to those skilled in the art.

SUMMARY OF THE INVENTION

Briefly, the above and other objects, features and advantages of the present invention are achieved in one aspect thereof by employing as the vehicle for aqueous coating compositions a water-soluble or water-dispersible resin prepared by at least partially neutralizing an addition product of an $\alpha,\beta$-unsaturated dicarboxylic compound and a butadiene polymer, having a number average molecular weight of 400–10,000 and containing 40–75% cis-1,4-bonds, 15% or less trans-1,4-bonds and 20–50% 1,2-bonds in the butadiene units forming the polymer chain, with a basic compound.

DETAILED DISCUSSION

The butadiene polymers used in this invention are butadiene homopolymers or copolymers having a number average molecular weight of 400–10,000, preferably 500–4,000; and containing 40–75%, preferably 45–70% and especially 50–65%, cis-1,4-bonds; 15% or less, preferably 12% or less and especially 10% or less, trans-1,4-bonds; and 20–50%, preferably 25–45% and especially 30–45%, 1,2-bonds in the butadiene units forming the polymer chain. Suitable butadiene copolymers are prepared by copolymerizing butadiene with monoolefinic hydrocarbons or conjugated dienes, e.g. styrene, isoprene or 1,3-pentadiene, in minor amounts so as not to intrinsically hinder the effects of this invention. Such copolymers contain at least 50%, preferably 70%, and more preferably 90% or more by weight of units derived from butadiene. However, especially preferred is the use of a butadiene homopolymer.

Butadiene polymers of this type can be prepared by polymerizing 1,3-butadiene or a mixture of 1,3-butadiene and comonomers in the presence of Ziegler-Natta type catalyst comprising an organic aluminum compound, a cobalt compound and an organic phosphorous compound (e.g. Japanese Patent Gazette No. 50-2628). This invention, however, is not limited by the particular method of preparing the butadiene polymers, as suitable methods are known in the art. Nevertheless, it is undesirable to use a butadiene polymer or copolymer having a number average molecular weight of less than 400 because the films obtained will have poor smoothness and considerably lower mechanical properties. On the other hand, it is likewise undesirable to use a butadiene polymer or copolymer having a number average molecular weight of more than 10,000 because such polymers react only with difficulty with the $\alpha,\beta$-unsaturated carboxylic compounds without gelation and it is difficult to obtain a coating composition suitable for painting due to the high viscosity of the resultant water based solution.

In addition to the criticality of molecular weight, it is furthermore very important in this invention to use a butadiene polymer whose percentages of cis-1,4-bonds, trans 1,4-bonds and 1,2-bonds contained in the butadiene units forming the polymer chain each lie within the above-mentioned respective ranges. For example, when the 1,2-bond content is less than 20%, even if the cis-1,4-bond content is 40-75%, the composition so obtained will be inferior in water resistance. Similarly, when the 1,2-bond content is more than 50%, the composition will be inferior in corrosion resistance and in smoothness of the film. On the other hand, when the cis-1,4-bond content is less than 40% or the trans-1,4-bond content is in excess of 15% (even if the 1,2-bond content is 20-50%), the composition so obtained will give coatings which are inferior in both water- and corrosion-resistance as well as in film smoothness and hardness.

The addition products of a butadiene polymer and an $\alpha,\beta$-unsaturated dicarboxylic compound which are used in this invention can be easily prepared by conventional techniques of reacting a mixture of 100 parts by weight of a butadiene polymer and of 5-50 parts by weight, preferably 10-30 parts by weight, of an $\alpha,\beta$-unsaturated dicarboxylic compound for 0.5-10 hours in the presence or absence of a diluent, a reaction accelerator and/or a gelation inhibitor. In heretofore reacting 1,2-polybutadienes with an $\alpha,\beta$-unsaturated dicarboxylic compound, it has been known that the reactivity between the two substances is quite low. In contradistinction, the butadiene polymer used in this invention surprisingly has an excellent reactivity with the $\alpha,\beta$-unsaturated carboxylic compounds, so that the reaction can be completed in a short time without gel formation.

The $\alpha,\beta$-unsaturated dicarboxylic compounds used in this invention are represented by the general formula:

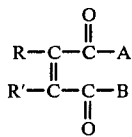

wherein R and R' are each selected from the group consisting of a hydrogen atom, a halogen atom and an alkyl group; and A and B are each selected from the group consisting of a hydroxyl group and an alkoxy group or A and B together form an -O- bond. Suitable $\alpha,\beta$-unsaturated carboxylic compounds include but are not limited to such compounds having up to 8 carbon atoms, e.g. maleic acid, chloromaleic acid, fumaric acid, citraconic acid, maleic anhydride, chloromaleic anhydride, citraconic anhydride, 1,2-diethylmaleic anhydride, monomethyl maleate, monoethyl maleate, etc. Of these, maleic anhydride is especially preferred in terms of economy and quality.

The addition product of the butadiene polymer and the $\alpha,\beta$-unsaturated carboxylic compound can be made soluble or dispersible in water by, subject to the normal method, at least partially neutralizing the addition product with a basic compound, e.g. an organic amine, ammonia or an inorganic alkaline compound. Suitable such basic compounds include but are not limited to ethyl amine, ethylmethyl amine, diethyl amine, triethyl amine, tertiarybutyl amine, ethanol amine, diethanol amine, triethanol amine, diethylaminoethanol, N-methyl morpholine, aqueous ammonia, sodium hydroxide, calcium hydroxide, ammonium carbonate, sodium carbonate, calcium carbonate, etc.

The extent of neutralization required will depend on the intended use of the final product. In order to prepare a water based paint for use in brush painting or spray coating, at least 45%, preferably 55% and more of the acid functions on the addition product should be neutralized whereas in electrodeposition paints 45-95%, preferably 55-85% of the carboxylic groups on the addition product should be neutralized. Dependent on the degree of neutralization and the nature of the neutralizing agent, the aqueous preparations will exhibit a pH of 5 – 12, preferably 6– 10.

Before, during or after the neutralization, it is possible to add an alcohol, e.g. methanol, ethanol, propanol, butanol, ethylcellosolve, butylcellosolve, diacetonealcohol, etc. to improve workability by lowering the viscosity. A suitable amount of such alcohol additives is less than 50 parts by weight per 100 parts by weight of the resin. In order to avoid the formation of amides, if aqueous ammonia, primary or secondary amines are used as neutralizing agents, it is suitable to saponify anhydride groups containing addition products to polymer dicarboxylic acids with water, or to esterify them to polymer dicarboxylic acid half-esters with said alcohols, before adding the basic compound. One of these ways is recommendable too, if amino - alcohols are used as neutralizing agents in the preparation of electrodeposition coating materials.

The addition product thus made soluble or dispersible in water is used in aqueous coating compositions with a solids content of 5-60%. When such a composition is used as a water based paint, it is appropriate to mix the composition with a suitable pigment, e.g. titanium white, lithopone, calcium carbonate, iron oxide red, minium (red lead), carbon black and Hansa yellow to the extent of less than 400 parts by weight per 100 parts by weight of the resin. If desired, conventional anti-oxidants and/or fillers may be incorporated into the paint mixture in the customary amounts to achieve the effect desired.

When the thus-obtained water based paint for use in brush painting or in spray coating is to be hardened at ambient temperature or by baking, it is appropriate to add a metal soap, e.g. of cobalt, lead or manganese, as a drier. For use in electrodeposition coating, a thermosetting water-soluble resin, e.g. a melamine resin, a phenolic resin or an epoxy resin, can be added.

Furthermore, this invention allows the additional use of water-soluble or water-dispersible resins prepared from materials widely known as vehicles of aqueous coating compositions, e.g. natural drying oils, alkyd resins, liquid cis-1,4-polybutadiene and liquid 1,2-polybutadiene, insofar as the effects of this invention are not intrinsically hindered thereby. At this stage of preparing water-soluble resins, the butadiene polymer used in this invention may be mixed with such other widely known materials.

The aqueous coating compositions thus obtained by this invention are capable of forming films which are not only superior in the resistance to corrosion and to water but also favorable in such physical properties as hardness, adhesion, impact strength and flexibility. They show excellent throwing and drainage properties in electrodeposition coating as well. As an electrodeposition paint in particular, the aqueous coating compositions of this invention exhibit a performance which is remarkably improved in comparison with paints based on other liquid polybutadienes such as cis-1,4-polybutadiene as starting materials.

The above values, as well as those given in the following examples, were determined according to the standardized methods; JIS indicates Japanese Industrial Standards:

Pencil Hardness: Paint Testing Manual - ASTM Special Technical Publication 500, p. 283;
Erichsen Depression (mm.): JIS Z 2247 (eqiv. to DIN 53 156);
Bending Value: ASTM D 1737 (with a diameter of the cylindrical mandrel of 3 mm);
Impact Strength: ASTM D 2794;
Corrosion Resistance: ASTM B 117;
Water Resistance: ASTM D 870 (with a water temperature of 40° C.);
Set to Touch Time: ASTM D 1640;
Dry hard Time: ASTM D 1640;
Film Thickness: ASTM D 1400 Method A;
Throwing Power: Ford Motor's Method;
Viscosity: in undiluted form at 30° C. using a rotational viscosimeter;
Number average molecular weight: vapor pressure Osmometer;
IR Analysis: NaCl prism spectrometer.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

Preparation of Starting Materials

SAMPLE A

A liquid polybutadiene was synthetized by polymerizing 1,3-butadiene in a benzene solution at 50° C. with cobalt octoate - diethyl aluminum chloride - water -triphenyl phosphite ( 1 : 5.6: 0.7: 1 ) as the catalyst. This polybutadiene product had a number average molecular weight of 2020 as determined by means of a vapor-pressure osmometer, a viscosity of 1600 centipoise at 30° C., a cis-1,4-bond content of 54%, a trans-1,4-bond content of 10% and a 1,2-bond content of 36% determined by the infrared absorption spectrum.

100 parts of this polybutadiene were mixed in a four-necked flask with 10 parts of xylene, 0.04 parts of acetyl-acetone and 0.6 parts of copper naphthenate solution (5% copper content). This mixture was heated while being agitated by nitrogen blowing therein. When the internal temperature had reached 100° C., 17 parts of maleic anhydride were added with further heating. After the temperature had reached 190° C., the temperature was held for three hours and it was confirmed that there was no unreacted maleic anhydride existing in the batch. The reaction was then terminated and the xylene was collected while the pressure was being reduced.

SAMPLE B 62 parts of a commercially available liquid polybutadiene (made by Huels, "POLYOIL-110"; number average molecular weight 1600; cis-1,4-bond content 74%; trans-1,4-bond content 25%; 1,2-bond content 1%) which contains few 1,2-bonds but predominantly 1,4-bonds were mixed with 38 parts of a commercially available liquid polybutadiene which contains predominantly 1,2-bonds (made by Nippon Soda, "NISSO PB, B-2000"; number average molecular weight 2000; 1,2-bond content 91%; trans-1,4-bond content 9%) to prepare a uniform mixture. In the same manner as in Sample A, 100 parts of this mixture were reacted with 17 parts of maleic anhydride to obtain an addition product thereof.

SAMPLE C

By using a commercially available liquid polybutadiene which contains predominantly 1,2-bonds and trans-1,4-bonds in nearly equal amounts (made by Lithium Corp., "LITHENE PM"; molecular weight 1300; cis-1,4-bond content 15%; trans-1,4-bond content 40%; 1,2-bond content 45%), an addition product was obtained in the same manner as in Sample A from 100 parts of the polybutadiene and 17 parts of maleic anhydride.

SAMPLE D

A liquid polybutadiene was synthesized by polymerizing 1,3-butadiene in a benzene solution at 50° C., with cobalt octoate - diethyl aluminum chloride - water - triphenyl phosphine ( 1 : 9,3: 0.8: 3 ) as the catalyst. This polymer product had a number average molecular weight of 1640, a viscosity of 1430 centipoise at 30° C., a cis-1,4-bond content of 34%, a trans-1,4-bond content of 8% and a 1,2-bond content of 58%. In the same manner as in Sample A, an addition product was obtained from 100 parts of this polybutadiene and 17 parts of maleic anhydride.

SAMPLE E

By inverting the mixing ratio of the two polybutadienes used in Sample B, 38 parts of the liquid polybutadiene containing predominantly cis-1,4-bonds (POLYOIL-110) were mixed with 62 parts of the polybutadiene (NISSO-PB B 2000) to prepare a mixture, 100 parts of which were reacted in the same manner as in Sample A with 17 parts of maleic anhydride to obtain an addition product thereof.

SAMPLE F

In the same manner as in Sample A, an addition product was obtained from 100 parts of the liquid polybutadiene containing predominantly cis-1,4-bonds (POLYOIL-110) and 17 parts of maleic anhydride.

SAMPLE G

A liquid polybutadiene was synthesized by polymerizing 1,3-butadiene in a benzene solution at 50° C., with cobalt octoate - diethyl aluminum chloride - water - triphenyl phosphite (1 : 35 : 2.9 : 1.8) as the catalyst. This polymer product had a number average molecular weight of 8500, a cis-1,4-bond content of 79%, a trans-1,4-bond content of 6% and a 1,2-bond content of 15%. An addition product was obtained from 100 parts of this polybutadiene and 17 parts of maleic anhydride in the same manner as in Sample A.

EXAMPLE 2

Use in Electrodeposition

Eighty-five parts of each of the modified polybutadienes (Samples A-G) obtained in Example 1 above were admixed with triethylamine in the amount of approximately 0.8 equivalent per carboxyl equivalent of the resin at 60° C. for 30 minutes and then with 15 parts of butylcellosolve. The resulting mixture was thoroughly blended for 2 minutes and then immediately diluted with distilled water to form a water dispersion having a solids content of approximately 10% by weight and a pH of 7.5–8.5.

With the thus-obtained aqueous paint formulations A'-G' used as electrodeposition materials, pieces of untreated bright steel plates were subjected as the anode to direct current for two minutes at 25° C. and with an interpolar distance of 7 cm. The resultant coated sheets were thereafter taken out, flushed with water, air-dried and baked at 170° C. for thirty minutes. The properties of the films thus obtained and the throwing power during the electrodeposition coating operation are shown in Table 1.

From these results, it can be seen that the coating compositions of this invention form films having superior resistance to both corrosion and water as well as excellent properties in hardness and adhesion. However, the composition (B) prepared by using cis-1,4-polybutadiene and 1,2-polybutadiene in combination has insufficient resistance to both corrosion and water and is remarkably inferior in other properties.

EXAMPLE 3

Air-Drying Aqueous Paint Coating

Samples A and F obtained in Example 1 were each reacted for 30 minutes at 60° C. with diethylaminoethanol in the amount of approximately 0.6 equivalent per carboxyl equivalent and then diluted by admixture with distilled water to form an aqueous water dispersion having a solids content of approximately 30% by weight. To 100 parts of this dispersion were added 150 parts of minium; 0.03 part (as metallic cobalt) of cobalt naphthenate; 0.5 part (as metallic lead) of lead naphthenate; and 0.05 part (as metallic manganese) of manganese naphthenate. The resulting mixture was agitated by means of a pigment dispersing device to form an aqueous minium paint, which was then applied to untreated dull steel plates by means of a 100 μapplicator and dried at ambient temperature. The results are as shown in Table 2 below.

TABLE 2

| | Aqueous Paint Coating | |
|---|---|---|
| | Invention | Control |
| Polymer material | A | F |
| Coating composition | H | I |
| Set-to-touch time (min.) | 45 | 40 |
| Drying to hardness time (hr.) | 3.5 | 3.5 |
| Film properties after 24 hrs.: | | |
| Film thickness (λm) | 30 | 31 |
| Pencil hardness | F | B |
| Cross cut value | 100/100 | 100/100 |
| Bending property (mmφ) | 4 | 6 |
| Du Pont impact strength (½' × g × cm) | 500×40 | 500×30 |
| Water resistance (hr.) | >400 | 300 |
| 5% NaCl sprayed (hr.) | >400 | >400 |

From these results, it can be seen that Composition H of the present invention is clearly superior in hardness, flexibility, impact strength and water resistance as compared with the coating material (Composition I) obtained from cis-1,4-polybutadiene, which is known to have excellent properties as an air-drying aqueous paint and was accordingly employed for purposes of comparison with the air-drying aqueous paint of the present invention.

The preceding examples can be repeated with similar success by substituting the generically or specifically described reactants and/or operating conditions of this invention for those used in the preceding examples.

From the foregoing description, one skilled in the art can easily ascertain the essential chracteristics of this invention and, without departing from the spirit and scope thereof, can make various changes and modifications of the invention to adapt it to various usages and conditions.

What is claimed is:

1. In an aqueous coating composition comprising a water-soluble or water-dispersible film-forming resin, the improvement wherein said resin consists essentially of the addition product obtained by:
    (a) reacting (i) an α,β-ethylenically unsaturated dicarboxylic acid or anhydride with (ii) a butadiene polymer having a number average molecular weight of 400–10,000 and containing 40–75% cis-1,4 double bonds, 20–50% vinyl 1,2 double bonds and not more than 15% trans-1,4 double bonds in the butadiene units of the polymer chain; and
    (b) neutralizing the resultant addition product to render said product soluble or dispersible in water.

2. A composition according to claim 1 wherein said α,β-ethylenically unsaturated dicarboxylic compound

TABLE 1

| | Electrodeposition Coating | | | | | | |
|---|---|---|---|---|---|---|---|
| | Invention | Controls | | | | | |
| Polymer material | A | B | C | D | E | F | G |
| Coating composition | A' | B' | C' | D' | E' | F' | G' |
| Voltage (volts) | 100 | 100 | 100 | 60 | 100 | 100 | 100 |
| Throwing power | 100 | 95 | 100 | 100 | 100 | 80 | 100 |
| Film properties: | | | | | | | |
| Thickness (λm) | 28 | 26 | 30 | 23 | 18 | 28 | 25 |
| Appearance:[1] | + | + | − | − | + | + | + |
| Pencil hardness | 4H | H | sB | 5H | 4H | B | F |
| Cross cut value | 100/100 | 100/100 | 100/100 | 100/100 | 100/100 | 100/100 | 100/100 |
| Ericksen value (mm.) | 6 | 8 | 2.5 | 8 | 8 | 6.5 | 6 |
| Bending property (mmφ) | 6 | >10 | >10 | 2 | 2 | >10 | >10 |
| Du Pont impact strength (½' × g × cm) | 500×40 | 500×40 | 500×50 | 500×40 | 1000×35 | 500×30 | 500×30 |
| Corrosion resistance (Saline spray)[2] | >240 | 88 | 98 | 160 | 64 | >240 | >240 |
| Water resistance (hr.)[3] | >300 | 144 | 44 | >240 | >240 | 80 | 95 |

[1]The mark "+" indicates a film flat and smooth on the surface, while "−" indicates that wrinkles and unevenness are seen.
[2]Time required for the corrosion width to reach 3 mm. with a 5% brine sprayed at 35° C.
[3]Time required for wrinkles and unevenness to appear while being dipped at 40° C.

is selected from the group consisting of maleic acid, chloromaleic acid, fumaric acid, citraconic acid, maleic anhydride, chloromaleic anhydride, citraconic anhydride, 1,2-diethylmaleic anhydride, monomethyl maleate and monoethyl maleate.

3. A composition according to claim 2 wherein said compound is maleic anhydride.

4. A composition according to claim 1 wherein 5 – 50 parts by weight of (i) are condensed with 100 parts by weight of (ii).

5. A composition according to claim 1 wherein said butadiene polymer has a molecular weight of 500–4,000 and contains 40–75% cis-1,4-bonds, 12% or less trans-1,4-bonds and 25–45% vinyl-1,2-bonds in said butadiene units.

6. A composition according to claim 1 in the form of a water-based paint further containing a pigmenting amount of less than 400 parts by weight per 100 parts by weight of said resin of a pigment.

7. A composition according to claim 1 in the form of an electrodeposition paint further containing a water-soluble thermosetting resin.

8. A coating prepared by depositing the composition according to claim 1 onto a substrate and curing the resultant coating layer to form a water-resistant and corrosion-resistant film.

* * * * *